Aug. 26, 1941.   N. W. AUGUSTINE   2,254,193
CONVERTIBLE VEHICLE
Filed Sept. 20, 1939   2 Sheets-Sheet 1
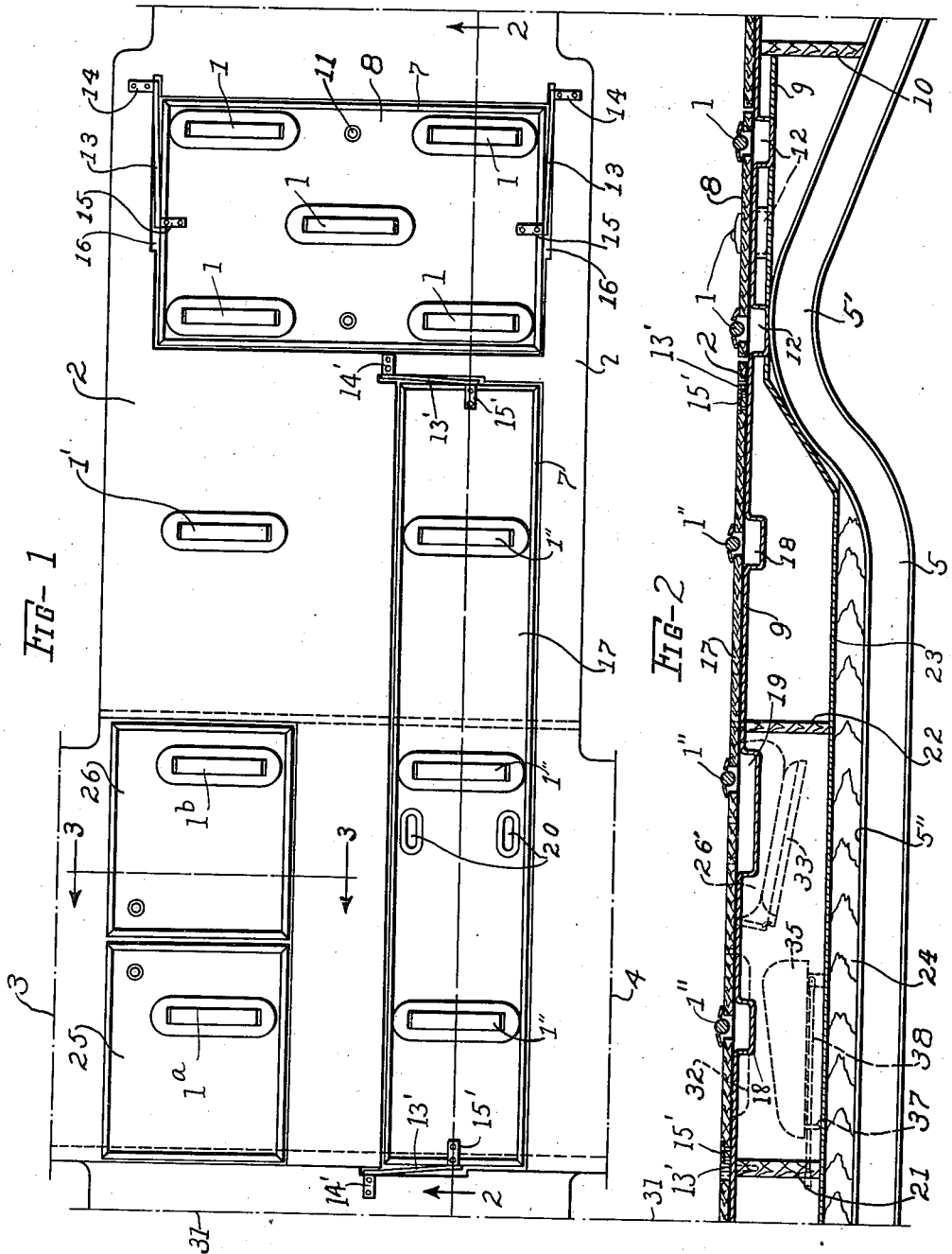
Inventor
Nathaniel W. Augustine
By Staley & Welch
Attorneys

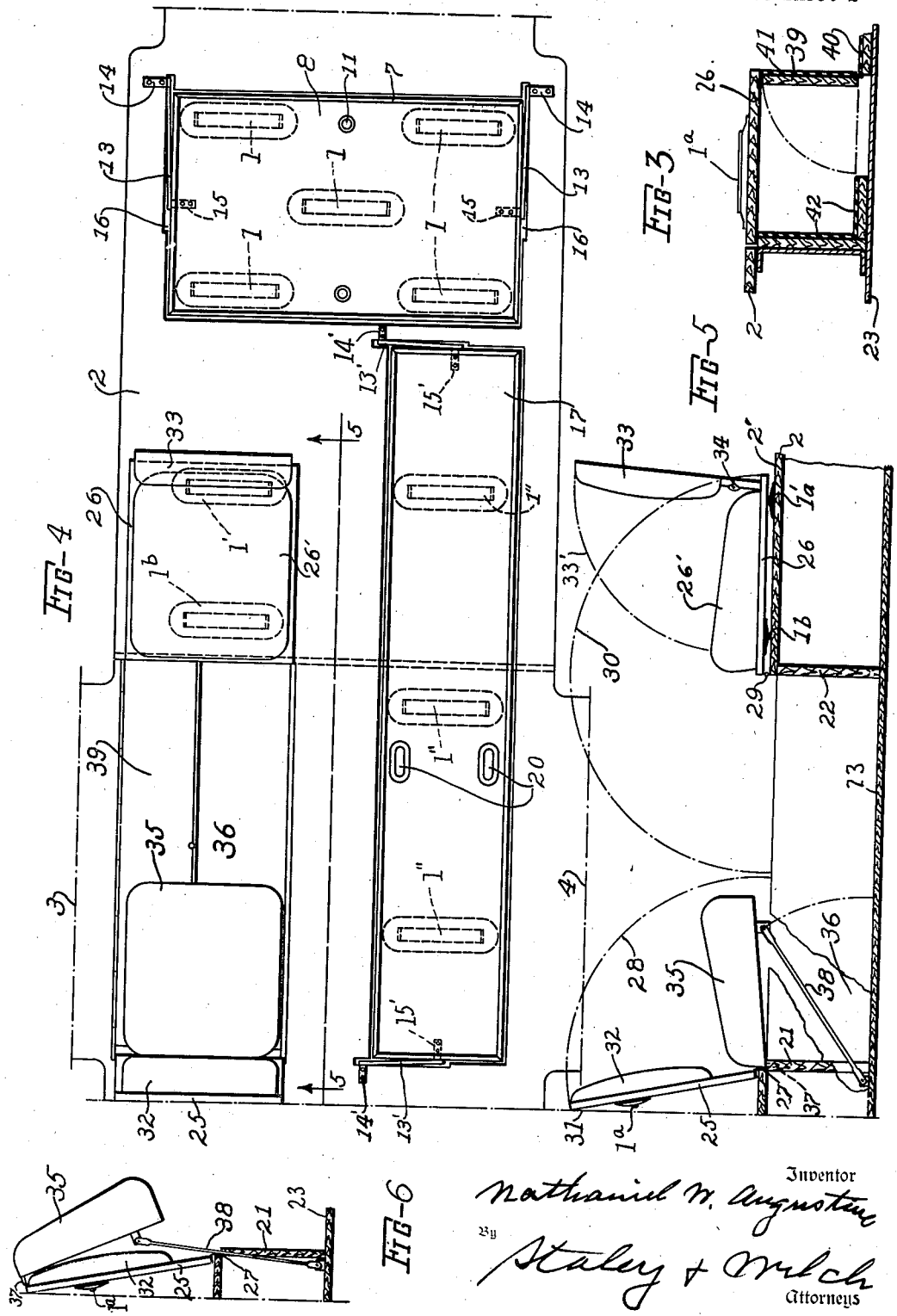

Patented Aug. 26, 1941

2,254,193

UNITED STATES PATENT OFFICE 2,254,193

CONVERTIBLE VEHICLE

Nathaniel W. Augustine, Bellefontaine, Ohio, assignor to The A. J. Miller Company, Bellefontaine, Ohio, a corporation of Ohio Application September 20, 1939, Serial No. 295,797

9 Claims. (Cl. 296—63)

This invention relates to improvements in convertible vehicles, it more especially relating to means for converting a funeral vehicle such as a hearse to an ambulance or invalid car.

An object of the invention is to provide folding seats for attendants such as physicians or nurses when the vehicle is in use as an ambulance; these seats when not in use, as when the vehicle is converted to a hearse, being disposed when folded in a compartment lower than the floor on which the casket rests.

A further object is to provide means to utilize the compartment in which the folded seats are disposed as a lower step for the attendant when carrying a patient into the vehicle on a stretcher.

A further object is to provide an arrangement whereby when the vehicle is converted from a hearse to an ambulance it will be comfortable for both the attendants and the patient without increasing the overall height of the vehicle; a further and more specific object of the invention in this connection being to provide a depression or compartment for the legs of the attendants below the floor level of the vehicle which also acts as a storage place for the seats for the attendants when the vehicle is in the form of a hearse.

In the accompanying drawings:

Fig. 1 is a fragmentary plan view of the floor of a vehicle when the same is arranged as a hearse.

Fig. 2 is a longitudinal section on the line 2—2 of Fig. 1.

Fig. 3 is a transverse section on the line 3—3 of Fig. 1.

Fig. 4 is a fragmentary plan view similar to Fig. 1 but with some of the parts in a different working position. In this view the vehicle has been converted to the ambulance form.

Fig. 5 is a partial longitudinal section similar to Fig. 2 with some of the parts in a different working position.

Fig. 6 is a view of a portion of Fig. 5 showing the manner in which the seat is made ready for folding.

Referring to the drawings, a floor plan only of a vehicle is shown in Fig. 1 with the parts arranged to adapt the vehicle for use as a funeral car. In Fig. 1 the forward end or driver's compartment is at the left end of the figure and the casket may be loaded into the vehicle from the opposite or rear end (right end of Fig. 1), the casket being rolled in over rollers of well known form such as indicated at 1, 1', 1'', 1a, and 1b. A portion of the floor is left undisturbed in the change-over operation. This portion is indicated at 2, and carries one of the rollers indicated at 1'. The vehicle is provided with side entrances such as indicated at 3 on the right-hand side of the vehicle and at 4 on the left-hand side, these entrances being shown in broken lines.

The reason for converting a funeral car to an ambulance is an obvious one because of the different uses to which the vehicle may be put, but one of the functions for the manner as described in this invention is to conceal certain inside appearances of a funeral car when the vehicle is serving as an ambulance, it having been found that patients object to the sight of casket rollers.

In view of the fact that an emergency call for an invalid vehicle leaves very little time for conversion, the means for making the conversion is designed to require a minimum of time and at the same time effectively conceal certain such equipment that would remind a patient of a funeral vehicle.

Referring to Fig. 2, the floor level is elevated to clear the up-curved portion 5' of the vehicle frame 5. This floor level is known as the casket table, and all the movable parts of the floor that enter into the conversion are at the same floor level. The upper or visible part of the flooring may be of wood, the different sections of which are trimmed with moulding 7.

One of such movable floor sections is indicated at 8, and in this case is provided with five of the casket rollers 1. This floor section 8 is adjacent the rear door of the vehicle and is supported on a formed sheet metal support 9, which support 9 is supported by the frame, one of the supports being a wooden rear transverse member 10 shown in Fig. 2. By lifting the floor section 8 by one of the finger holds 11, the floor section 8 may be inverted and again lowered, the inverting operation providing that the casket rollers on this section 8 are in inoperative positions since they are now on the lower side of the floor section 8 as shown by the broken line in Fig. 4. To accommodate the casket rollers 1 when the floor section 8 is inverted and to provide that, when inverted, the floor section 8 remains flush with the undisturbed floor portion 2, the supporting sheet metal member 9 is provided with depressions 12, Fig. 2.

To facilitate the inverting of the floor section 8, use is made of a pair of connecting bars 13 hingedly connected to stationary members 14, Fig. 1, and at their other ends to hinge members 15 attached to the floor section. These hinge members are preferably depressed so as to lie below the floor line, there being a groove 16 formed in the floor portion 2 to accommodate the links 13.

For the inversion of the casket rollers 1″ along the left-hand side of the floor, Fig. 1, a floor section 17 is provided. This section 17 extends longitudinally of the floor at one side of the floor from the section 18 to the forward end of the floor and to enable it to be inverted to the position shown in Fig. 4 links 13′ pivoted to stationary members 14′ and hinge members 15′ are employed. In Fig. 1 the roller side is uppermost while in Fig. 4 the inversion has been made whereby the casket rollers 1″ are turned downwardly. Depressions 18 and 19 are formed in the forward portion of the sheet metal support 9 to receive the casket rollers 1″, the depression 19 under the central roller being elongated forwardly to provide clearance for the fingers when the fingers are inserted through the hand holds 20. The forward end of the sheet metal support 9 is supported on wooden members 21 and 22 which in turn rest on a sheet metal member 23 and spacers, one of which is shown at 24, resting on the frame member 5.

One of the reasons for the curvature of the frame 5 as shown is to clear the rear axle (not shown) and to reduce the overall height of the vehicle. The floor level necessarily is placed quite close to the upper portion of the curve 5′ of the frame 5, and above the frame 5 at the normal elevation thereof such as at 5″ a considerable space is provided. This space is utilized in the present invention in two ways: First, it provides a compartment in which the folded seats are disposed; second, a step is provided at a point intermediate of the ground and the floor level; third, it provides a space for the legs of the attendants when the vehicle has been converted into an ambulance.

In the upper left-hand portion of Fig. 1 which represents the appearance of the floor near the right-hand side entrance 3 when the vehicle is arranged as a hearse, there is provided a pair of movable floor sections 25 and 26, each of which in the present case is provided with a casket roller indicated respectively at 1a and 1b. Preferably, each floor section 25 and 26 is hingedly connected to the fixed part 2 of the floor, one hinge being indicated at 27, Fig. 5, for the floor section 25 whereby that floor section may be swung upwardly and forwardly as indicated by the dot-dash arc 28, and the hinge 29, Fig. 5, to allow the floor section 26 to swing upwardly and rearwardly as indicated by the dot-dash arc 30. When the floor section 25 is swung upwardly and forwardly as shown in Fig. 5 the floor section rests against a vertical partition represented at 31 dividing the driver's compartment from the main part of the vehicle thereby concealing the casket roller 1a on this floor section from view. Also, it exposes the cushion 32 which is attached to the underneath side of the floor section 25.

When the floor section 26 is swung upwardly and rearwardly as shown in Fig. 5 a portion of the weight is born by the hinge 29 and casket roller 1′ thereby concealing this casket roller and the casket roller 1b secured to the floor section 26. In placing the floor section 26 as shown in Fig. 5 a seat cushion 26′ is brought upwardly and a back 33 hingedly connected by the hinge 34 to the floor section 26 may then be swung up on the arc 33′ to a substantially vertical position. A seat 35 is provided for an attendant who utilizes the back cushion 32 and is shown in position in Fig. 5. This seat 35 is disposed in the seat compartment 36 when the vehicle is serving as a hearse and is brought upwardly to position and retained at that position by the insertion of pins, one of which is shown at 37 in Fig. 5 in vertically disposed openings in the supporting member 21. The rearward end of the seat 35 is braced by the hinged brace 38.

It will be seen in Fig. 5 from the position of the seats 26′ and 35 that the space in the seat compartment 36 is utilized as leg room for the attendants. Therefore, the attendants when seated are at but slightly higher elevation than the floor level and therefore have ample head room even with the low overall height such as desired for vehicles of this class.

Referring to Fig. 4 which shows a floor plan as arranged for an ambulance, a support for the movable hinged floor sections 25 and 26 is provided by a riser member 39 (see also Fig. 3) hingedly connected to a wooden strip 40 attached to the sheet metal under-floor 23. As previously described, the space 36 known as the seat compartment utilizes the space between the floor level and the space above the straight portions 5″ of the frame, and when the hinged sections 25 and 26 are arranged for the ambulance form the hinged riser 39 is swung downwardly into position to complete the floor of the compartment 36. As shown in Fig. 3 the outer face of the hinged riser 39 may be covered with rubber moulding 41 to correspond with a similar covering 42 in the fixed portion of the compartment 36.

In the operation of converting the vehicle from the arrangement as shown in Fig. 1, which is for funeral car purposes, all of the casket rollers being uppermost, the floor sections 8 and 17 are inverted and again lowered in place as described. The floor section 25 is swung upwardly and forwardly to the position as shown in Fig. 5. The forward seat is raised and secured in place by the insertion of the pins 37 in the openings in the member 21. The floor section 26 is inverted, Fig. 5, and the seat back 33 raised to position, after which the hinged supporting riser 39 is swung downwardly into place. The appearance of the seats when the floor sections 25 and 26 are returned to the position shown in Fig. 1 is shown by broken lines in Fig. 2.

Applicant has filed a divisional application for the subject matter of the claims relating to the rollerways, which claims were erased from the present application because of a requirement for division, this divisional application being Serial No. 347,102 filed July 24, 1940.

It will be noted from Fig. 6 that the seat 35 may be positioned against the back 32 carried by the floor section 25, this being to enable the seat 35 to be folded out of the way of attendants carrying a cot so that the attendants can step into the compartment and have ample room to permit passage therethrough.

Having thus described my invention, I claim:

1. In a convertible vehicle of the character described, a pair of hinged floor sections, seats for each of said floor sections, a hinged riser to provide a support for said floor sections when closed, said riser being adapted to be swung downwardly to form a part of the floor of a compartment beneath said floor sections, and another floor compartment member beneath said hinged floor sections to cooperate with said riser to complete the floor of the compartment.

2. In a convertible vehicle of the character described, a pair of hinged floor sections one of which is adapted to swing rearwardly and the other forwardly, a seat on one side of one of said hinged floor sections, a hinged seat for the other floor section, a compartment to receive said seats when said floor sections are swung to closed positions, a hinged riser in said compartment to provide a support for the said hinged floor sections when closed and adapted to be swung downwardly to complete the floor of the compartment.

3. In a convertible vehicle of the character described, a hinged floor section, a seat back associated with said floor section, a compartment below said floor section to receive the seat back when said floor section is in closed position, said compartment acting as a leg-receiving space for attendants when said floor section is swung to open position, and movable means to form a floor member for said compartment when said hinged floor section is in open position and to form a support for said hinged floor section when said hinged floor section is swung to closed position.

4. In a convertible vehicle of the character described, a pair of hinged floor sections, a seat associated with each of said floor sections, a hinged back associated with each of said floor sections, a compartment below said floor sections to receive the seats and backs when said floor sections are in closed position, said compartment acting as a leg-receiving space for attendants when said floor sections are swung to open position and the seats and backs positioned to receive occupants, and movable means to form a floor member for said compartment when said floor sections and their seats and backs are in open position and to form a support for said hinged floor sections when said hinged floor sections are swung to closed position.

5. In a convertible vehicle of the character described, a hinged floor section, a seat and back associated with said floor section, a compartment below said floor section to receive the seat and back when said floor section is in closed position, said compartment acting as a leg-receiving space for attendants when said floor section is swung to open position, said back being hinged so as to be swung to upright position when said floor section is in open position, and means for supporting said seat such as to permit it to be positioned against said back to provide a clearance space in said compartment.

6. In a convertible vehicle of the character described, a pair of hinged floor sections one adapted to be swung rearwardly and the other forwardly, a seat and a back associated with each of said floor sections, the seat for the rear floor section being located directly thereon and the back hinged thereto, the back associated with the forward lower section being located directly thereon and the seat supported independently thereof but foldable against the associated back to permit it to be positioned out of the way of attendants entering the vehicle through said compartment.

7. In a convertible vehicle of the character described, a pair of hinged floor sections one of which is adapted to swing rearwardly and the other forwardly, one of said hinged floor sections having a seat on one side thereof, a hinged seat for the other floor section, and a compartment below said floor sections to receive said seats when said floor sections are swung to closed position, said compartment also acting as a leg-receiving space for attendants when said hinged floor sections are swung rearwardly and forwardly to open position, said compartment having a floor member to provide a foot rest, said compartment floor member being movable to permit it to be positioned to form a support for said hinged floor sections when said hinged floor sections are in closed position.

8. In a convertible vehicle of the character described, a pair of hinged floor sections one of which is adapted to swing rearwardly and the other forwardly, the rearwardly swinging section having a seat on one side thereof, a hinged back for said last-mentioned section, a hinged seat for the other floor section, and a compartment below said floor sections to receive said seats and back when said floor sections are swung to closed position, said compartment also acting as a leg-receiving space for attendants when said hinged floor sections are swung rearwardly and forwardly to open position, said compartment having a floor member to provide a foot rest, said compartment floor member being movable to permit it to be positioned to form a support for said hinged floor sections when said hinged floor sections are in closed position.

9. In a convertible vehicle of the character described, a pair of hinged floor sections, each of said sections having a seat and back associated therewith, and a compartment below said floor sections to receive the seats and backs when said floor sections are in closed position, said compartment acting as a leg-receiving space for attendants when said floor sections are swung to open position, said compartment having a floor member to provide a foot rest, said compartment floor member being movable to permit it to be positioned to form a support for said hinged floor sections when said hinged floor sections are in closed position.

NATHANIEL W. AUGUSTINE.